(12) United States Patent
Dorndorf et al.

(10) Patent No.: US 9,482,471 B2
(45) Date of Patent: Nov. 1, 2016

(54) MELT METALLURGICAL INSTALLATION COMPRISING A CHARGING ELEMENT

(75) Inventors: Markus Dorndorf, Baden-Baden (DE); Hansjörg Huber, Kehl (DE)

(73) Assignee: PRIMETALS TECHNOLOGIES AUSTRA GmbH, Linz (AT)

( * ) Notice: Subject to any disclaimer, the term of this patent is extended or adjusted under 35 U.S.C. 154(b) by 597 days.

(21) Appl. No.: 13/824,654

(22) PCT Filed: Jul. 28, 2011

(86) PCT No.: PCT/EP2011/062972
§ 371 (c)(1),
(2), (4) Date: Mar. 18, 2013

(87) PCT Pub. No.: WO2012/034766
PCT Pub. Date: Mar. 22, 2012

(65) Prior Publication Data
US 2013/0181383 A1    Jul. 18, 2013

(30) Foreign Application Priority Data

Sep. 16, 2010 (DE) .......................... 10 2010 040 879

(51) Int. Cl.
*F27D 17/00* (2006.01)
*C21C 5/52* (2006.01)
*F27B 3/18* (2006.01)

(52) U.S. Cl.
CPC ............. *F27D 17/001* (2013.01); *C21C 5/527* (2013.01); *F27B 3/183* (2013.01); *Y02P 10/216* (2015.11)

(58) Field of Classification Search
CPC ........ C21C 5/527; C21C 5/40; Y02W 30/54; F27D 17/001; F27B 3/183; Y02P 10/2016
USPC ................... 266/44, 158, 900, 901
See application file for complete search history.

(56) References Cited

U.S. PATENT DOCUMENTS 3,764,027 A * 10/1973 Tokarz ...................... C21B 7/20
                                                    266/176
4,824,364 A *  4/1989 Kobari ...................... C22B 9/16
                                                    432/156
(Continued)

FOREIGN PATENT DOCUMENTS

AT           17399         1/1986
AT           40590         2/1989
(Continued)

OTHER PUBLICATIONS

International Search Report for PCT/EP2011/062972, mailed Nov. 17, 2011.
(Continued)

*Primary Examiner* — Scott Kastler
*Assistant Examiner* — Michael Aboagye
(74) *Attorney, Agent, or Firm* — Staas & Halsey LLP

(57) ABSTRACT

A melt metallurgical installation has a melting furnace for melting scrap metal and a charging region for the melting furnace which is located above the melting furnace. The installation further has a charging element, which has been filled with scrap metal intended for the melting furnace and can be moved in a movement direction into the charging region where it can be emptied and then moved again, in the empty state, against the movement direction out of the charging region. The charging region is enclosed by a hood such that the charging region, including the charging element which has been placed in the charging region, is closed at the top and on the sides. The hood has at least one upper extraction opening through which the waste gases and dust developing in the hood can be extracted out of the hood.

11 Claims, 5 Drawing Sheets

(56) References Cited

U.S. PATENT DOCUMENTS

| | | | |
|---|---|---|---|
| 5,647,288 A | | 7/1997 | Matsumoto et al. |
| 6,024,912 A | * | 2/2000 | Wunsche .................. 266/44 |
| 6,155,333 A | * | 12/2000 | Vallomy ................... 164/476 |
| 7,648,551 B2 | * | 1/2010 | Sellan ..................... 75/10.62 |

FOREIGN PATENT DOCUMENTS

| | | |
|---|---|---|
| CN | 1086894 | 5/1994 |
| CN | 1224064 | 7/1999 |
| CN | 2339586 | 9/1999 |
| CN | 1279293 | 10/2006 |
| DE | 1063342 | 8/1959 |
| DE | 102010040879.4 | 9/2010 |
| DE | 102009031648 | 1/2011 |
| RU | 2 044 977 C1 | 9/1995 |
| RU | 2 293 938 C1 | 2/2007 |
| RU | 2 295 683 C2 | 3/2007 |
| UA | 19770 U | 12/2006 |
| UA | 41448 U | 5/2009 |
| UA | 51849 U | 8/2010 |
| WO | 00/50648 | 8/2000 |
| WO | PCT/EP2011/062972 | 7/2011 |

OTHER PUBLICATIONS

Chinese Office Action for related Chinese Patent Application No. 201180044311.2, mailed Jan. 28, 2014, 11 pages.

Russian Office Action dated May 12, 2015 in corresponding Russian Patent Application No. 2013117130/02(025432) with German Translation.

Ukrainian Office Action dated Jan. 26, 2016 in corresponding Ukrainian Patent Application No. a 2013 03196 with German Translation.

\* cited by examiner

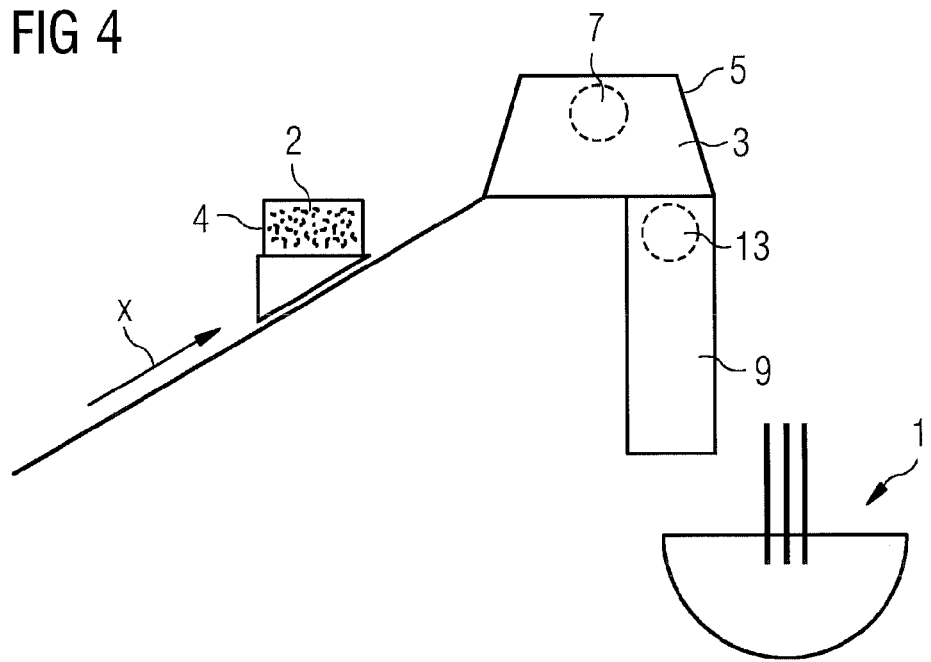
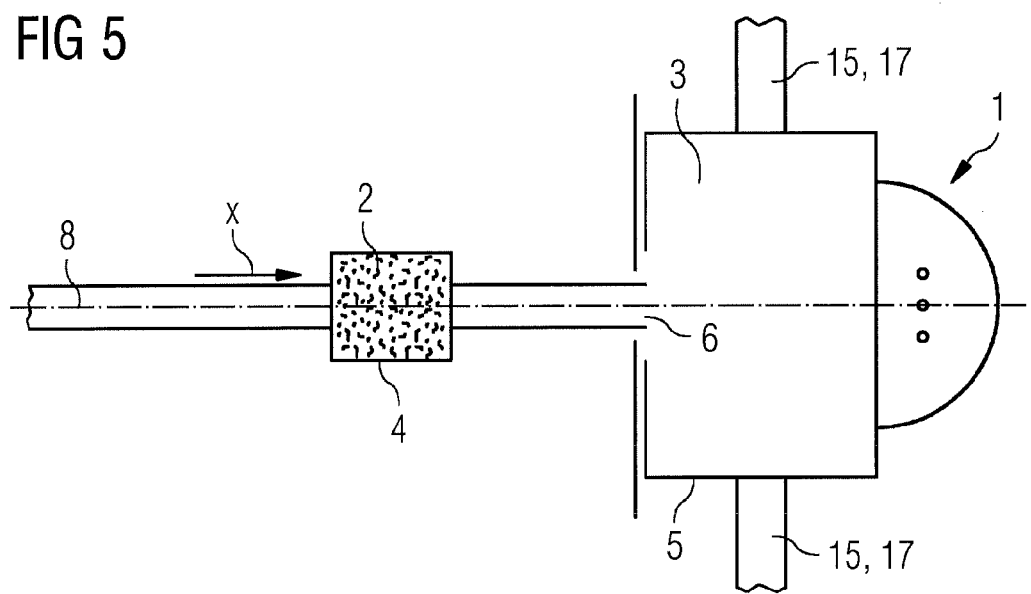

MELT METALLURGICAL INSTALLATION COMPRISING A CHARGING ELEMENT

CROSS REFERENCE TO RELATED APPLICATIONS

This application is based on and hereby claims priority to International Application No. PCT/EP2011/062972 filed on Jul. 28, 2011 and German Application No. 10 2010 040 879.4 filed on Sep. 16, 2010, the contents of which are hereby incorporated by reference.

BACKGROUND

The present invention relates to a melt metallurgical installation.

Melt metallurgical installations of this kind are generally known. In particular, melt metallurgical installations comprising electric arc furnaces are constructed in this way.

When loading a melting furnace there is usually a significant occurrence of fumes and dust clouds, what are known as secondary waste gases. In a conventional design of the melting furnace the fumes and dust clouds pass unhindered into the production hall in which the melt metallurgical installation is arranged. They are conventionally extracted from there via a hall extraction system or the like. A hall extraction system of this kind is also called a secondary waste gas extraction system since most of the waste gases, the primary gases, originating from the furnace chamber are conventionally extracted and after-treated by a furnace extraction system or primary gas extraction system, which is separate therefrom, in the region of the furnace cover.

Austrian patent specification no. E 17399 B (EP 0063669) discloses a device for extracting secondary waste gases in steelworks and foundries in which there is a movable hood secured to a crane as the secondary waste gas extraction system.

Austrian patent specification no. E 40590 B (EP 0132876) discloses a device for extracting secondary waste gases in steelworks and foundries in which there are a fixed hood roof and movable hood side walls.

The embodiment of the related art has various drawbacks. In particular the hall extraction system acts on all openings in the hall. Other air flows are therefore sucked in to a considerable extent. It also takes a relatively long time for the fumes and dust clouds to be extracted. In the meantime a considerable amount of the dust in particular deposits itself in many cases on the floor of the production hall. Employees located in the production hall are also exposed to a considerable extent, and sometimes even to an extent that is dangerous to health.

German patent specification no. 1063342 describes a smoke extractor for extracting gases from the surroundings of electric arc furnaces, and this is arranged above the electrodes. However, a large quantity of secondary waste gases is still given off to the surroundings during loading of the furnace in this case as well.

SUMMARY

One possible object is to create a possibility by which fumes and dust clouds can be completely or at least largely prevented from escaping into the production hall during loading of the melting furnace.

The inventors propose a melt metallurgical installation wherein the melt metallurgical installation comprises a melting furnace for melting scrap metal and a charging region for the melting furnace arranged above the melting furnace, wherein the melt metallurgical installation comprises a charging element, which has been filled with scrap metal intended for the melting furnace and can be moved in a movement direction into the charging region where it can be emptied and then moved again, in the empty state, against the movement direction out of the charging region—that the charging region is enclosed by a hood such that the charging region, including the charging element which has been placed in the charging region, is closed at the top and on the sides, and that the hood comprises a number of upper extraction openings through which the waste gases and dust developing in the hood can be extracted out of the hood.

This embodiment of the installation has the advantage that a secondary waste gas extraction system can be omitted. Only a modified primary gas extraction system is used to prevent the development of secondary waste gases. The total quantity of waste gas which is to be after-treated is significantly reduced as a result and the apparatus expenditure for the installation is appreciably reduced.

In this connection the upper extraction openings are arranged as desired on the hood. The upper extraction openings are preferably arranged in the upper region of the hood, however. Particularly efficient extraction is possible with this embodiment.

The number of extraction openings can generally be selected as desired and is preferably equal to 1 to preferably equal to 10, optionally also more than 10.

The upper extraction openings are preferably arranged on either side of a, preferably vertical, plane defined by the movement direction of the charging element. Extraction is even more efficient as a result of this embodiment.

In many cases a chute is arranged between the melting furnace and the charging region, into which chute the scrap metal is conveyed when the charging element is emptied. The chute is preferably arranged eccentrically with respect to the melting furnace and above it. A "chute" is in this connection and hereinafter taken to mean any receptacle which is capable of receiving and pre-heating material, scrap metal in particular here.

Toward the charging region the chute in this case preferably comprises an upper closure element and this can be opened for conveying the scrap metal into the chute and then be closed again. The upper closure element can be formed of one or more component(s) which can be moved in combination or separately from each other. It is generally closed and is in particular opened only if scrap metal is to be conveyed from the charging element and into the chute. Therefore when the charging element is moved into and out of the charging region, the upper closure element is preferably closed, so no waste gases from the melting furnace pass into the charging region and can escape from there into the environment. The upper closure element is in particular only opened if the charging element is positioned over the chute and the waste gas rising over the chute can be extracted from the melting furnace via the hood.

Toward the melting furnace the chute preferably comprises a lower closure element which can be opened for loading the scrap metal from the chute into the melting furnace and can then be closed again. In the closed state the lower closure element enables temporary storage and preheating of the scrap metal due to waste gases from the melting furnace in the chute. This reduces the energy requirement and the costs for the melting process.

An extraction system connected to the upper extraction openings can preferably be controlled in this embodiment such that an activity of the extraction system can be coordinated with the opening and closing of the upper closure element and/or the charging state of the chute.

The inventors also propose a method for controlling an installation comprising a chute an extraction system connected to the upper extraction openings is controlled in such a way that an activity of the extraction system is coordinated with the opening and closing of the upper closure element and/or the charging state of the chute. The optimum quantity of waste gas is therefore extracted from the charging region at all times before the waste gas could escape from the charging region as secondary waste gas.

In a further preferred embodiment a number of lower extraction openings is arranged in the chute below the upper closure element, through which openings waste gases and dust developing in the chute can be extracted from the chute.

The lower extraction openings can in particular be arranged on either side of a vertical plane defined by the movement direction of the charging element. What is known as a primary extraction system of the primary waste gases is in particular implemented by the lower extraction openings, and this also exists in the related art, in order to extract the waste gases, which are produced during the melting process, from the melting furnace.

The upper and lower extraction openings are preferably connected to the same extraction device. In this case adjustable—in particular by a motor—closure flaps are also arranged at least in connecting pipes between the upper extraction openings and the extraction device, and preferably also in connecting pipes between the lower extraction openings and the extraction device.

In particular in the case where adjustable—in particular by a motor—closure flaps are arranged both in connecting pipes between the upper extraction openings and the extraction device, and also in connecting pipes between the lower extraction openings and the extraction device, adjustment drives for the closure flaps arranged between the upper extraction openings and the extraction device can preferably be controlled independently of adjustment drives for the closure flaps arranged between the lower extraction openings and the extraction device.

In many cases the movement direction of the charging element runs obliquely upwards. The movement direction can equally run vertically upwards or downwards. It is possible for an opening for moving the charging element in and out to be arranged in the hood. In this case the cross-section of the opening can preferably be reduced when the charging element has been moved into the hood. The opening can in particular be closed. The charging element can be inserted by way of example via a crane from above through an opening and into the hood, it being possible to open and close the opening by at least one slide. Alternatively it is possible for the hood to extend in the horizontal direction to the extent that the charging element enters the hood from below.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 4 shows a schematic representation of a melt metallurgical installation in the side view, FIG. 5 shows the melt metallurgical installation of FIG. 4 in the plan view and FIG. 6 shows the melt metallurgical installation of FIG. 4 in the front view.

DETAILED DESCRIPTION OF THE PREFERRED EMBODIMENT

Figure 1:
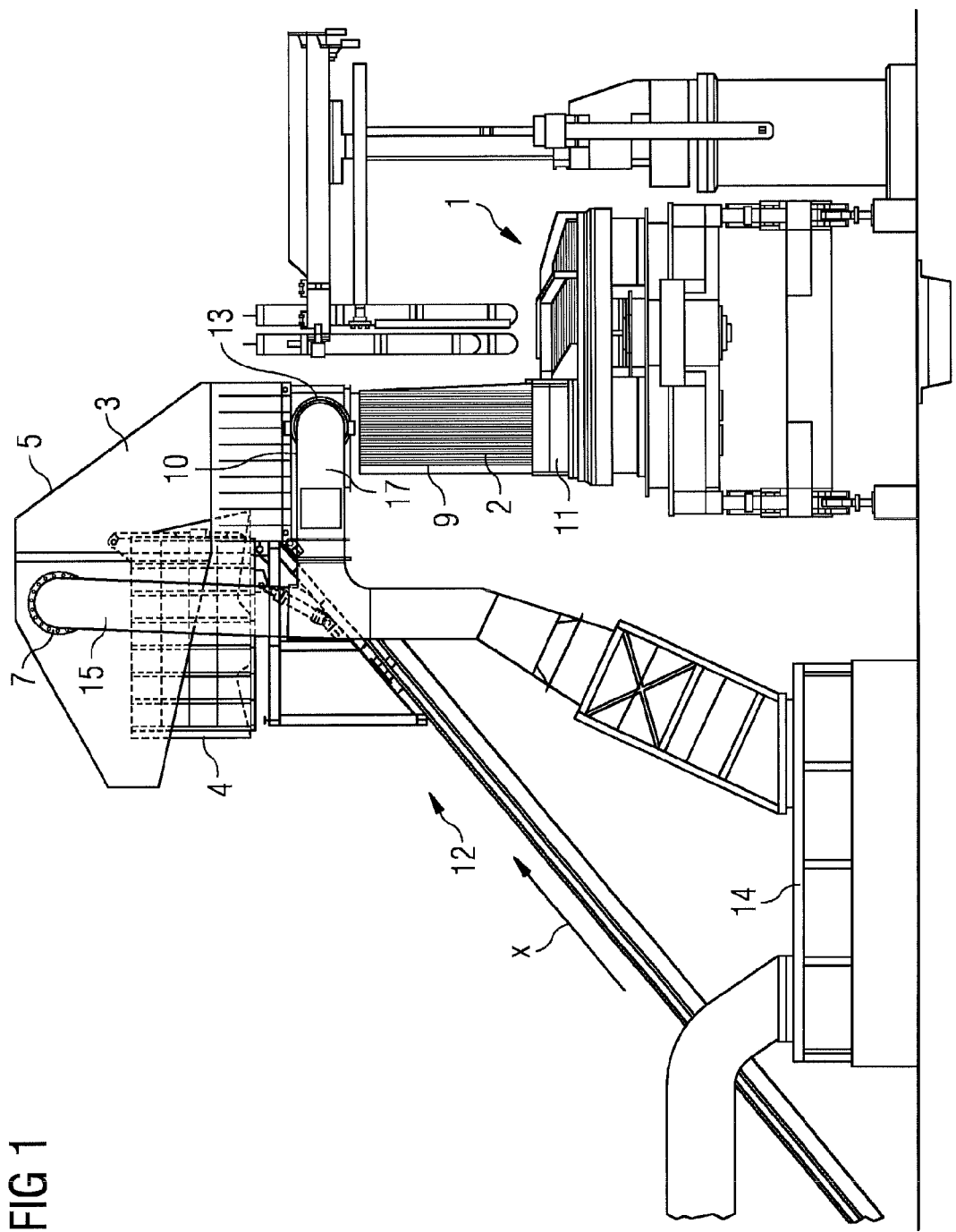
FIG. 1 shows a melt metallurgical installation in the side view.

Reference will now be made in detail to the preferred embodiments of the present invention, examples of which are illustrated in the accompanying drawings, wherein like reference numerals refer to like elements throughout.

According to the figures a melt metallurgical installation comprises a melting furnace 1. The melting furnace 1 is used to melt scrap metal 2. The melt metallurgical installation also comprises a charging region 3 for the melting furnace 1. The charging region 3 is arranged above the melting furnace 1. The melt metallurgical installation also comprises a charging element 4. The charging element 4 can be moved into the charging region 3 in a movement direction x and can be moved again against the movement direction x out of the charging region 3. The movement direction x can run horizontally in individual cases. As a rule, as may be seen from the figures, the movement direction x runs obliquely upwards, however. The charging element 4 is filled with scrap metal 2 which is intended for the melting furnace 1. In this state the charging element 4 is moved into the charging region 3 where it is emptied. It is then moved again out of the charging region 3 in the empty state.

The charging region 3 is enclosed by a hood 5. The charging region 3 is closed at the top and on the sides thereby. This state applies not only but in particular for the case where the charging element 4 has been brought into the charging region 3.

Figure 6:
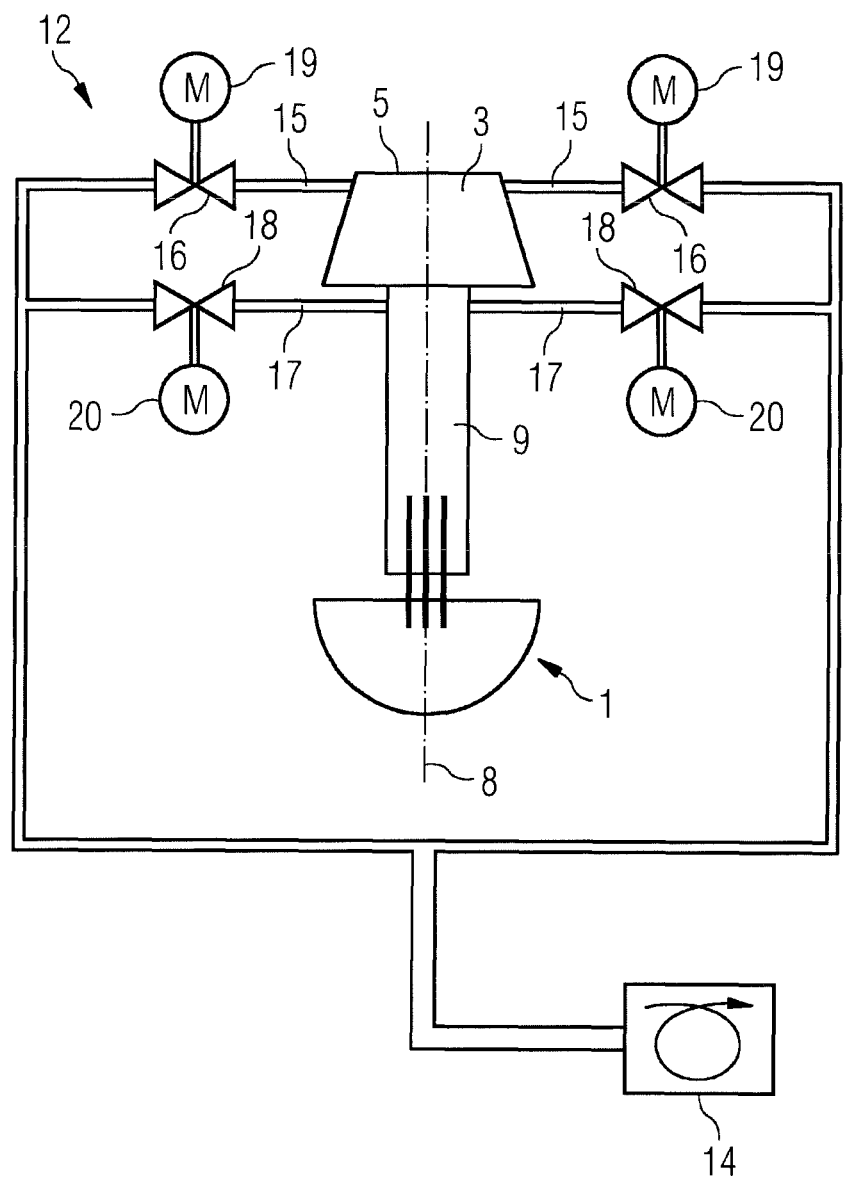

It is possible for an opening 6 to be arranged in the hood 5 for moving the charging element 3 in and out. FIGS. 4 to 6 show this embodiment. In this case it is possible for the opening 6 to be partially filled by the charging element 4 which has been brought into the charging region 3. Preferably however the charging element 4, if it has been brought into the charging region 3, is located completely inside the hood 5. In this case the cross-section of the opening 6 is preferably reduced in this state, i.e. if the charging element 4 has been moved into the hood 5. Moveable walls or corresponding flaps 7 by way of example may be provided for this purpose. The dimensioning can be such that the opening 6 is completely closed.

Figure 2:
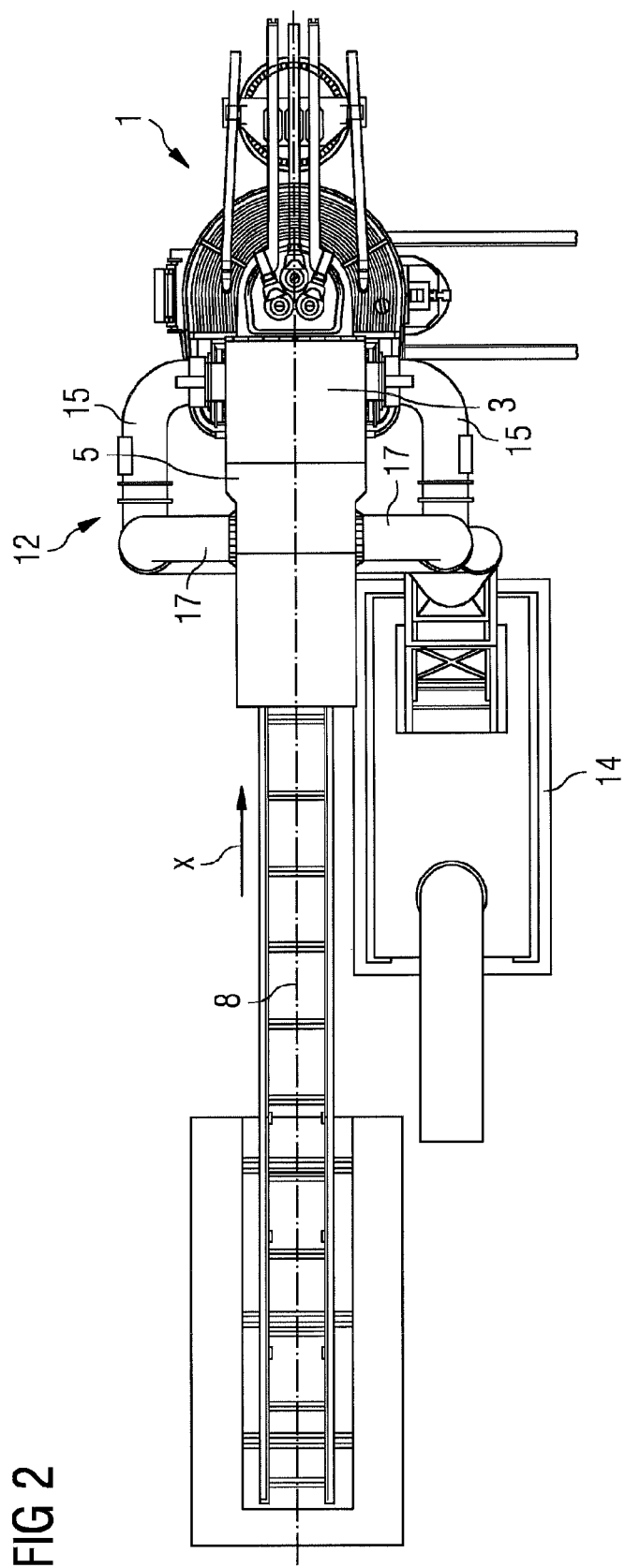
FIG. 2 shows the melt metallurgical installation of FIG. 1 from above.
Figure 3:
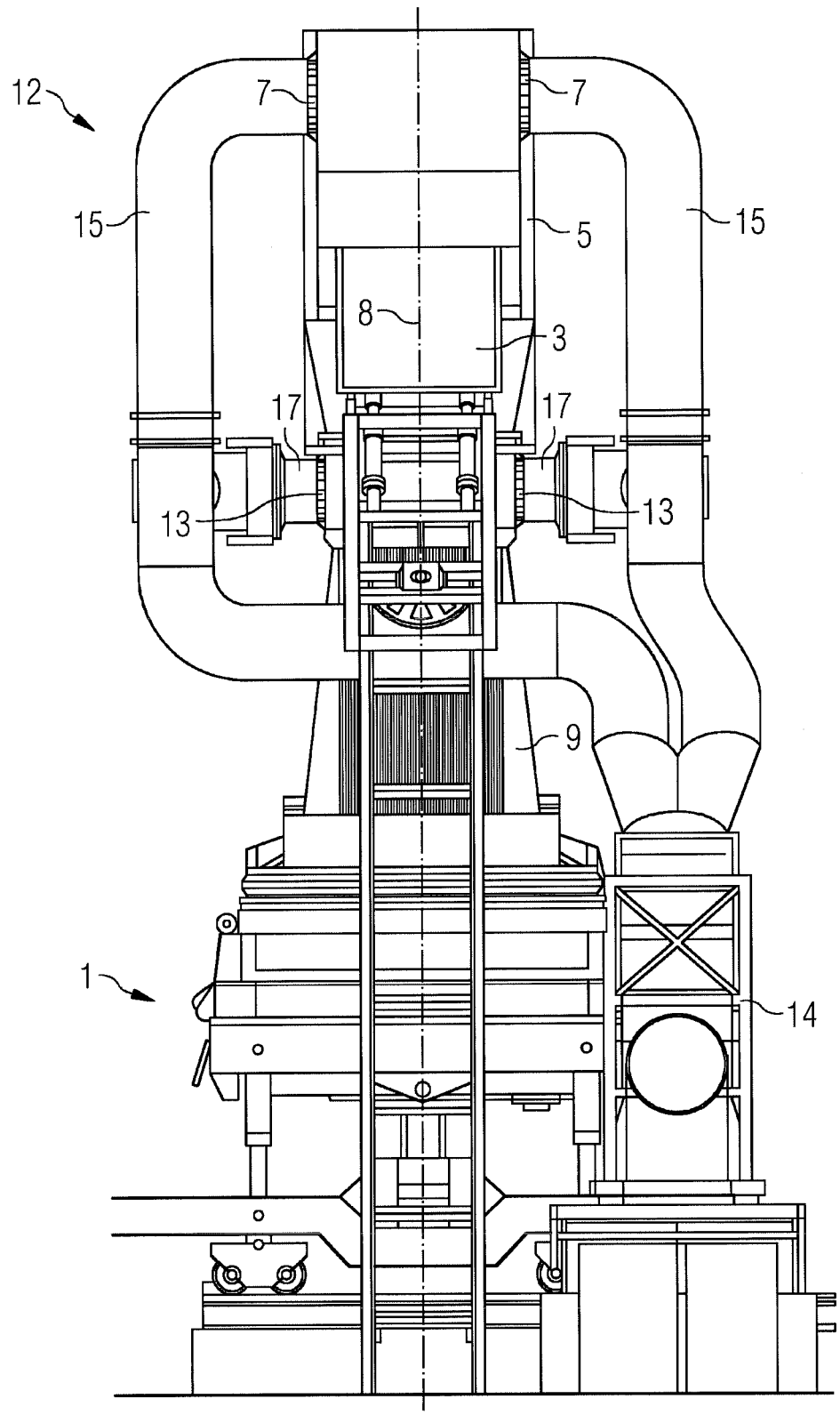
FIG. 3 shows the melt metallurgical installation of FIG. 1 in a front view.

Preferably however—see FIGS. 1 to 3—the hood 5 extends in the horizontal direction to the extent that the charging element 4 enters the hood 5 from below. As a result it is not necessary to provide an opening in the side region of the hood 5. If required the entry region, through which the charging element 4 enters the hood 5, can be reduced, in particular closed, in this embodiment as well.

The hood 5 comprises a number of upper extraction openings 7. The number of openings may be one. The upper extraction openings 7 are preferably arranged in the upper region of the hood 5 (i.e. at the highest point of the hood 5).

The upper extraction openings 7 can be arranged at any desired point of the hood 5, by way of example on the upper side of the hood 5 or in its side regions. The upper extraction openings 7 can in particular be arranged on either side of a vertical plane 8 which is defined by the movement direction x of the charging element 4. Waste gases and dust, which develop in the hood 5, can be extracted from the hood 5 via the upper extraction openings 7.

In many cases a chute 9 is arranged between the melting furnace 1 and the charging region 3. In this case the scrap metal 2 is not conveyed directly into the melting furnace 1 during emptying of the charging element 4, but firstly into the chute 9. The chute 9 comprises for this purpose an upper closure element 10 and a lower closure element 11. The upper closure element 10 is arranged toward the charging region 3. It can be opened and then closed again. It is opened if the scrap metal 2 is to be conveyed from the charging element 4 into the chute. Otherwise it is closed. The lower charging element 11 is arranged toward the melting furnace 1. It can also be opened and closed. It is opened if the melting furnace 1 is being loaded. Otherwise it is closed.

The danger of waste gases, dust, fumes, etc. entering the hood 5 and potentially escaping from the hood 5 exists in particular if the upper closure element 10 is open or the chute 9 is empty. An extraction system 12, which is connected to the upper extraction openings 7, is therefore preferably controlled in such a way that an activity of the extraction system 12 is coordinated with opening and closing of the upper closure element 10 and/or the charging state of the chute 9. In particular the extraction system 12 can be activated (or maximally activated) in the two cases stated above; otherwise it can be deactivated (or only partially activated).

As a rule a number of lower extraction openings 13 is arranged in the chute 9 below the upper closure elements 10. The lower extraction openings 13 can—analogously to the upper extraction openings 7—be arranged in particular on either side of the vertical plane 8 already mentioned. Waste gases and dust, which develop in the chute 9, can be extracted from the chute 9 via the lower extraction openings 13.

It is possible for a separate extraction device to be connected to the lower extraction openings 13 and this can be operated independently of the extraction system 12 for the upper extraction openings 7. The upper and lower extraction openings 7, 13 are preferably connected to the same extraction device 14, however. In this case motor-adjustable closure flaps 16 are arranged at least in connecting pipes 15, which are arranged between the upper extraction openings 7 and the extraction device 14. Motor-adjustable closure flaps 18 are preferably also arranged in connecting pipes 17, which are arranged between the lower extraction openings 13 and the extraction device 14.

It is possible for an adjustment of the closure flaps 16 to always be coupled with an adjustment of the closure flaps 18. In this case the closure flaps 16 on the one hand and the closure flaps 18 on the other hand can be adjusted only in opposite directions to each other. Adjustment drives 19 for the closure flaps 16 arranged between the upper extraction openings 7 and the extraction device 14 can preferably be controlled independently of adjustment drives 20 for the closure flaps 18 arranged between the lower extraction openings 13 and the extraction device 14, however. In this case at least three different operating states are possible, namely:

closure flaps 16 open, closure flaps 18 closed,
closure flaps 16, closed, closure flaps 18 open,
closure flaps 16 open and closure flaps 18 open.

The operating state where both the closure flaps 16 and closure flaps 18 are closed can potentially also be an option.

The inventors' proposals have many advantages. In particular development of secondary waste gases, such as fumes, dust, waste gases, etc., in a production hall, in which the metallurgical plant is arranged, is almost completely prevented.

The above description serves solely to illustrate the embodiments. For the person skilled in the art it readily follows that a wide variety of melt metallurgical installations can be constructed in a wide variety of embodiments with respect to the melting furnace, charging region, charging element and the hood.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for controlling an installation comprising:
charging scrap metal into a melting furnace from a charging region above the melting furnace, the melting furnace being charged via a chute, the chute preheating the scrap metal, the chute having upper and lower closure elements, the upper closure element being at an upper end of the chute, away from the melting furnace, the upper closure element being opened for conveying the scrap metal into the chute and then closed, the lower closure element being at a lower end of the chute, toward the melting furnace, the lower closure element being opened for loading scrap metal from the chute into the melting furnace and then closed;
using a charging element to move the scrap metal in a movement direction toward the charging region where the scrap metal can be emptied into the chute before the charging element is moved in a direction opposite to the movement direction, away from the charging region;
using a hood to at least partially enclose the charging region, such that when charging element is in the charging region, the hood encloses a top end of the charging element opposite the melting furnace and sides of the charging element, the hood having at least one upper extraction opening;
using an extraction system to extract waste gases and dust out of the hood via the upper extraction opening; and
controlling the extraction system such that extraction is coordinated with opening and closing of the upper closure element and/or conveyance of the scrap metal to the chute.

2. A melt metallurgical installation, comprising:
a melting furnace for melting scrap metal, the melting furnace being charged from a charging region above the melting furnace;
a charging element, to move the scrap metal in a movement direction toward the charging region where the scrap metal is emptied into the melting furnace before the charging element is moved in a direction opposite to the movement direction, away from the charging region;

a hood at least partially enclosing the charging region, such that when charging element is in the charging region, the hood encloses a top end of the charging element opposite the melting furnace and encloses sides of the charging element, the hood having an upper extraction opening through which waste gases and dust are extracted out of the hood; and a chute located between the melting furnace and the charging region to receive and preheat the scrap metal, the melting furnace being charged from the charging region via the chute, the chute being connected to an opening of the melting furnace, wherein the scrap metal is conveyed to the chute when the charging element is emptied, the chute has an upper closure element at an upper end, away from the melting furnace, the upper closure element being opened for conveying the scrap metal into the chute and then closed, the chute has a lower closure element at a lower end, toward the melting furnace, the lower closure element being opened for loading the scrap metal from the chute into the melting furnace and then closed, opening of the lower closure element causes the scrap metal in the chute to fall toward and into the melting furnace, an extraction system is connected to the upper extraction opening, the extraction system being controlled so as to perform an extraction coordinated with opening and closing of the upper closure element and/or conveyance of the scrap metal to the chute, at least one lower extraction opening is arranged in the chute below the upper closure element, waste gases and dust are extracted from the chute via the lower extraction opening, a common extraction device is connected to both the upper extraction opening and the lower extraction opening, an upper connecting pipe connects the upper extraction opening to the extraction device, and an upper adjustable closure flap is arranged in the upper connecting pipe.

3. The installation as claimed in claim 2, wherein the upper extraction opening is arranged in an upper region of the hood, opposite the melting furnace.

4. The installation as claimed in claim 2, wherein
a vertical plane extends up away from the melting furnace, through the movement direction of the charging element,
there are a plurality of upper extraction openings, and
the upper extraction openings are arranged on the hood, on either side of the vertical plane.

5. The installation as claimed in claim 2, wherein
the melting furnace has a center, and
the chute is arranged above the melting furnace eccentrically with respect to the center of the melting furnace.

6. The installation as claimed in claim 2, wherein
a vertical plane extends up away from the melting furnace, through the movement direction of the charging element,
there are a plurality of lower extraction openings, and
the lower extraction openings are arranged on the chute, on either side of the vertical plane.

7. The installation as claimed in claim 2, wherein
a lower connecting pipe connects the lower extraction opening to the extraction device, and
a lower adjustable closure flap is arranged in the lower connecting pipe.

8. The installation as claimed in claim 7, wherein
the upper and lower adjustable closure flaps are operated by respective adjustment drives, and
the adjustment drive for the upper closure flap is controlled independently of the adjustment drive for the lower closure flap.

9. The installation as claimed in claim 2, wherein
the movement direction runs obliquely upwards,
the hood has a hood opening through which the charging element moves in and out, and
the hood opening has a cross-section that is reduced when the charging element has been moved into the hood.

10. The installation as claimed in claim 9, wherein
the charging element is moved completely into the hood via the hood opening, and
the hood has a closure device to close the hood opening when the charging element has been moved inside the hood.

11. The installation as claimed in claim 2, wherein
the movement direction runs obliquely upwards,
the hood extends in a horizontal direction with respect to a vertically oriented melting furnace, such that the hood has a bottom that is at least partially open, and
the charging element enters the hood from bottom.

* * * * *